(12) United States Patent
Sonnenmoser et al.

(10) Patent No.: US 11,718,502 B2
(45) Date of Patent: Aug. 8, 2023

(54) SAFETY SYSTEM FOR BUILDING-RELATED PASSENGER TRANSPORTATION SYSTEM

(71) Applicant: Inventio AG, Hergiswil (CH)

(72) Inventors: Astrid Sonnenmoser, Hochdorf (CH); Axel Hosemann, Auw (CH)

(73) Assignee: INVENTIO AG, Hergiswil (CH)

( * ) Notice: Subject to any disclaimer, the term of this patent is extended or adjusted under 35 U.S.C. 154(b) by 320 days.

(21) Appl. No.: 16/648,273

(22) PCT Filed: Oct. 18, 2018

(86) PCT No.: PCT/EP2018/078520
§ 371 (c)(1),
(2) Date: Mar. 18, 2020

(87) PCT Pub. No.: WO2019/081332
PCT Pub. Date: May 2, 2019

(65) Prior Publication Data
US 2020/0283266 A1    Sep. 10, 2020

(30) Foreign Application Priority Data
Oct. 27, 2017   (EP) .................................... 17198934

(51) Int. Cl.
G05B 9/02       (2006.01)
B66B 5/00       (2006.01)
G06F 8/65       (2018.01)
G06F 21/57      (2013.01)

(52) U.S. Cl.
CPC .............. *B66B 5/0087* (2013.01); *G05B 9/02* (2013.01); *G06F 8/65* (2013.01); *G06F 21/575* (2013.01)

(58) Field of Classification Search
CPC ........... B66B 5/0087; G05B 9/02; G06F 8/65; G06F 21/575
See application file for complete search history.

(56) References Cited

U.S. PATENT DOCUMENTS

| 6,170,614 | B1 * | 1/2001 | Herkel | ...................... B66B 5/06 187/287 |
| 6,173,814 | B1 * | 1/2001 | Herkel | ...................... B66B 1/34 187/248 |
| 2009/0049441 | A1 | 2/2009 | Mii et al. | |
| 2009/0277724 | A1 * | 11/2009 | Thumm | .................... B66B 1/34 187/393 |
| 2011/0247901 | A1 * | 10/2011 | Wilke | ...................... G07C 9/20 187/247 |

(Continued)

FOREIGN PATENT DOCUMENTS

| EP | 1150190 A2 | 10/2001 |
| EP | 1857897 B1 | 1/2014 |

(Continued)

*Primary Examiner* — Ghazal B Shehni
(74) *Attorney, Agent, or Firm* — William J. Clemens; Shumaker, Loop & Kendrick, LLP

(57) ABSTRACT

A safety system for a building-related passenger transport system includes a safety unit for receiving safety-relevant signals from components of the passenger transport system and for triggering a safety measure, and an updating unit for receiving updated software via an external interface and for transmitting the updated software to the safety unit via an internal interface.

15 Claims, 3 Drawing Sheets

22, 22' CONTROL UNIT
36 SAFETY SYSTEM
38 UPDATING UNIT
40, 40', 40" SAFETY UNIT
44 COMMUNICATION UNIT
48 PROVIDER
50 UPDATED SOFTWARE

(56) References Cited

U.S. PATENT DOCUMENTS

| | | |
|---|---|---|
| 2014/0096126 A1 | 4/2014 | Gourlay et al. |
| 2014/0282458 A1* | 9/2014 | Gupta |
| 2016/0234396 A1* | 8/2016 | Yasukawa .......... H04N 1/00973 |
| 2018/0157482 A1* | 6/2018 | Kirchhoff ............. B66B 5/0087 |
| 2018/0314512 A1* | 11/2018 | Schonauer .............. H04L 67/12 |

FOREIGN PATENT DOCUMENTS

| | | |
|---|---|---|
| EP | 2916219 A1 | 9/2015 |
| WO | 2007014314 A2 | 2/2007 |
| WO | 2016180484 A1 | 11/2016 |

\* cited by examiner

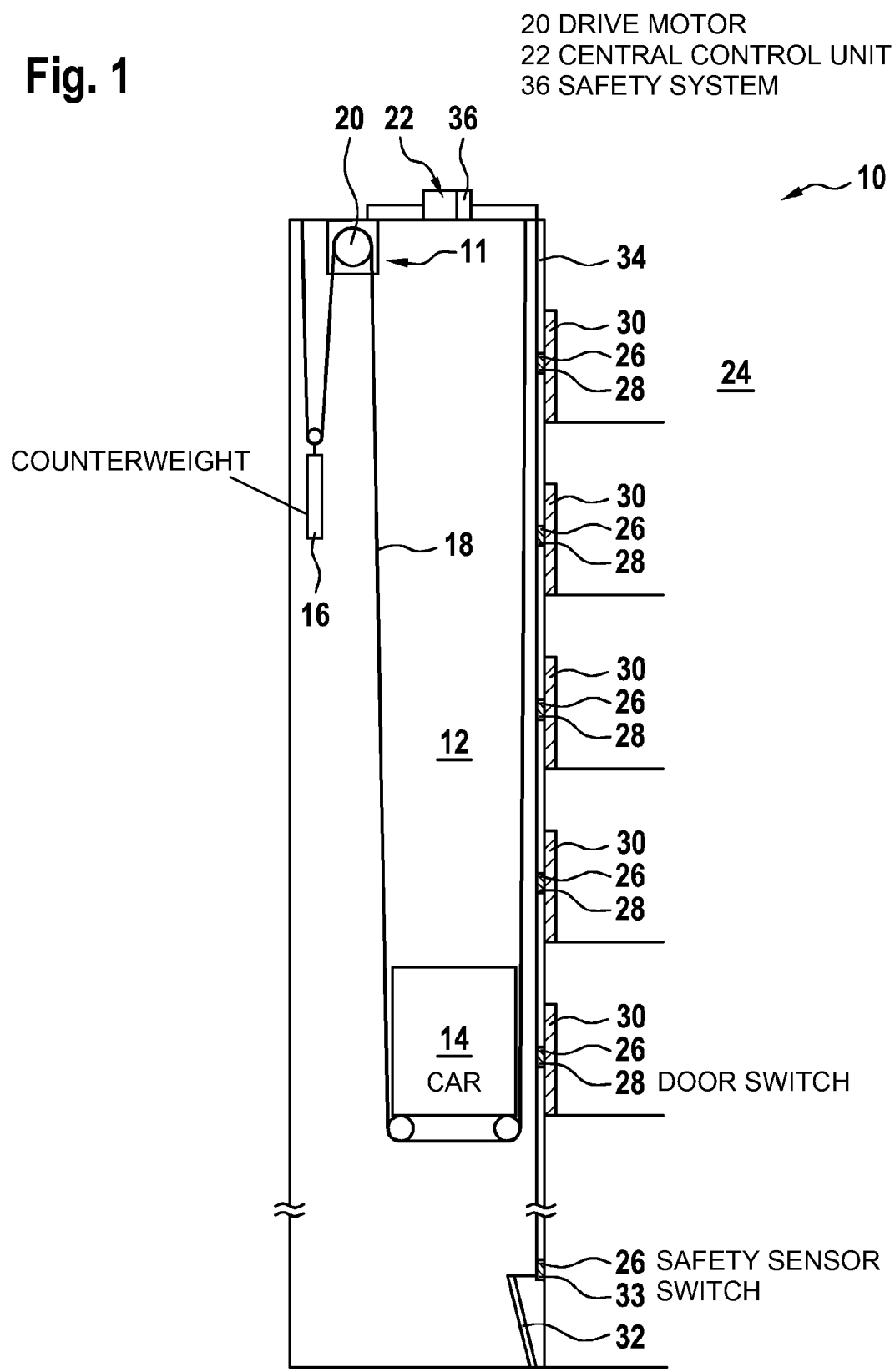

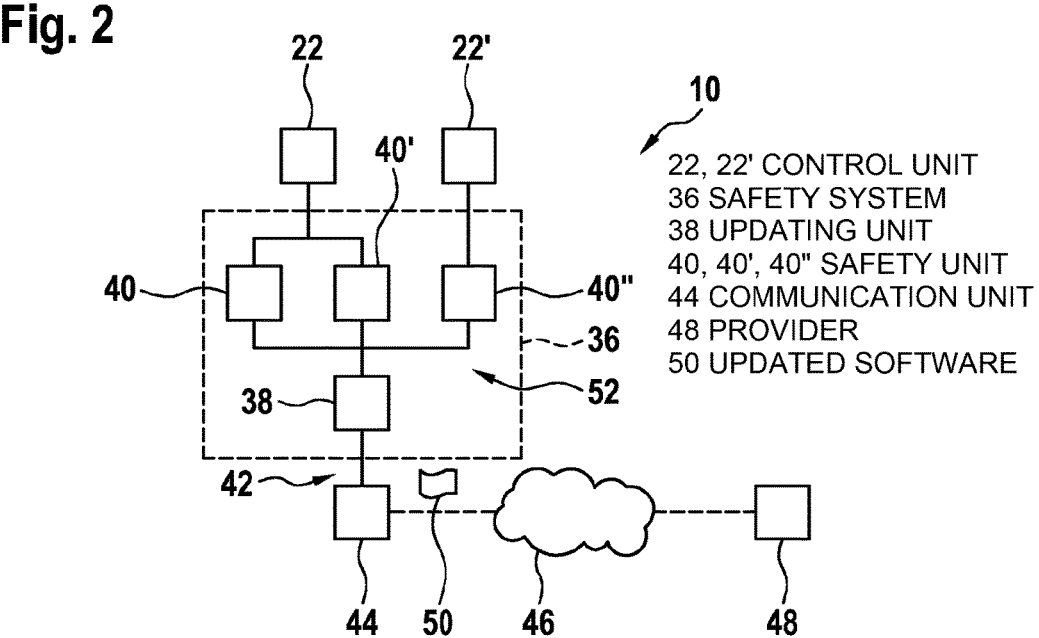
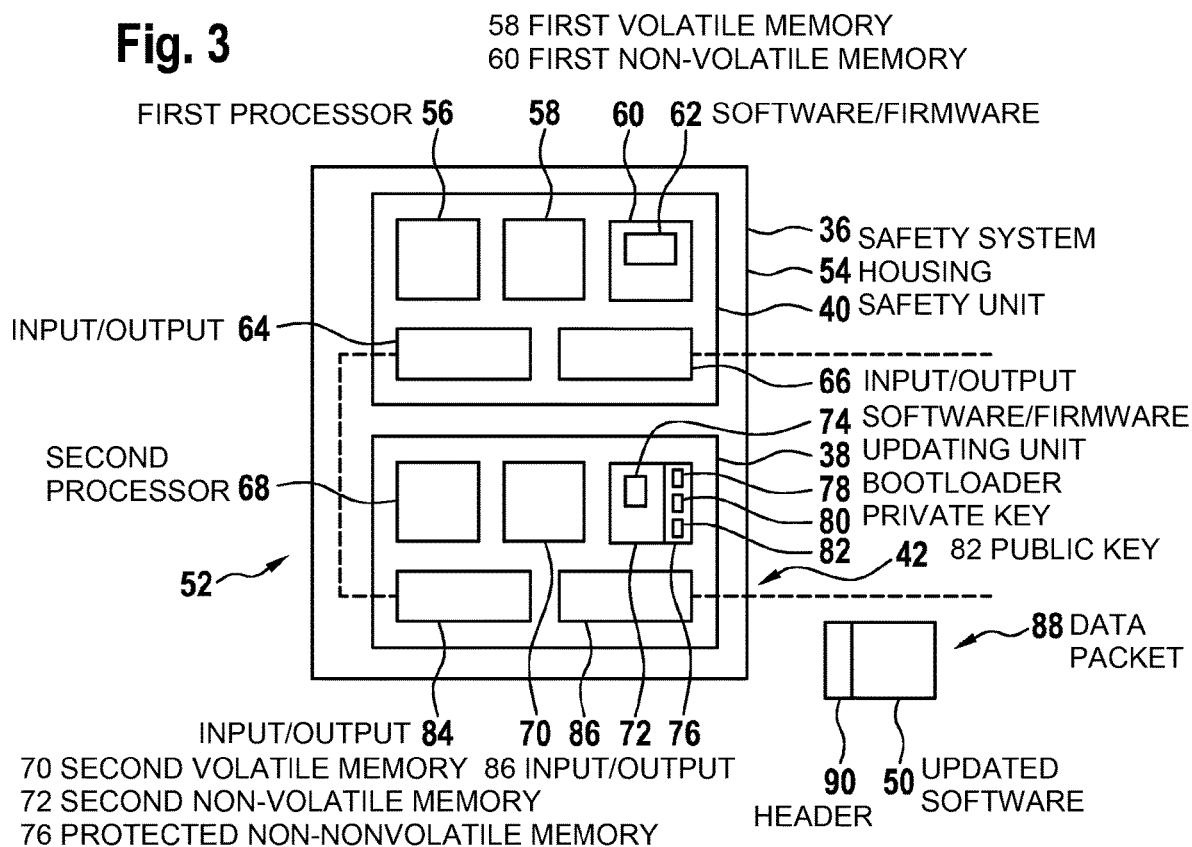

Fig. 4

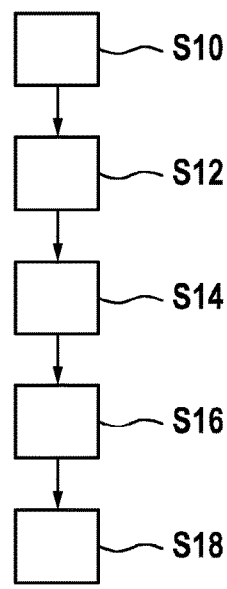

S10 updating unit 38 regularly queries provider 48 via external interface 42 whether updated software 50 is available S12 receive data packet 88 with updated software 50 by updating unit 38

S14 decryption

S16 updating unit 38 query safety unit 40 via internal interface 52 whether safety unit 40 is ready for transmission of updated software 50

S18 when safety unit 40 in update mode, updated software 50 is transmitted to safety unit 40 via internal interface

SAFETY SYSTEM FOR BUILDING-RELATED PASSENGER TRANSPORTATION SYSTEM

FIELD

The present invention relates to a safety system for a building-based passenger transport system and to a method for updating software of a safety system of this kind.

BACKGROUND

Building-based passenger transport systems, such as elevators, escalators and moving walkways, are used to transport persons within buildings. Elevator systems are used, for example, to make it possible to transport persons between different floors within a building. For this purpose, in general an elevator car can be moved inside a usually vertical elevator shaft. In the case of escalators or moving walkways, persons can be transported on step units along inclined or horizontal travel paths while standing.

In order to be able to ensure the safety of persons, many building-based passenger transport systems have a safety unit which receives signals from safety-relevant sensors, evaluates said signals and triggers a safety measure if an unsafe state is determined. The safety measure can, for example, consist in stopping the building-based passenger transport systems by transmitting a corresponding signal to a controller of the building-based passenger transport systems. For example, switches are usually attached to the doors of an elevator system, by means of which switches it can be checked whether the doors are closed. If not all doors are closed, the safety unit prevents the elevator car from being able to be moved in the shaft, in order to prevent persons from being trapped or falling into the shaft, for example.

Since safety units are usually installed in large numbers, it can be desirable to be able to update a software of the safety unit externally, for example via the internet. An external interface must also, however, be protected against unauthorized access. The complexity of safety units, however, should be kept as low as possible in order to ensure that the safety functions are carried out correctly and at any time. In addition, safety units of passenger transport systems usually have to be certified, which becomes more complex, and thus more costly, as the complexity of the safety units increases.

WO 2016/180484 A1, EP 2 916 219 A1 and U.S. Pat. No. 6,170,614 B1 describe methods for updating software in a safety monitoring system of an elevator system.

Overall, there can be a need for a safety system having a safety unit which has a simple design and a well-protected update function.

SUMMARY

One aspect of the invention relates to a safety system for a building-based passenger transport system. As already mentioned, a building-based passenger transport system may be an elevator system, an escalator system or a moving walkway system.

According to one embodiment of the invention, the safety system comprises a safety unit for receiving safety-relevant signals from components of the passenger transport system, and for triggering a safety measure. The safety-relevant signals can originate from safety sensors of the building-based passenger transport systems, and/or can be transmitted, for example, via a bus to the safety unit. Safety sensors may generally be any type of sensor that detects safety-related information about components of the building-based passenger transport system. Examples of such sensors are door-closing sensors which detect whether an elevator door is properly closed. The safety unit can be directly connected to a controller of the building-based passenger transport system that controls, for example, a drive and/or other actuators (such as door openers). The safety measure can, for example, consist in the safety unit transmitting a warning signal to a controller of the passenger transport system. If the safety unit issues a warning signal, the controller can, for example, prevent the drive and/or the actuators from being operated. Instead of transmitting a warning signal to the controller, the safety unit can also interrupt a power supply of the passenger transport system and therefore shut down the passenger transport system. Further safety measures are also conceivable.

The safety system further comprises an updating unit for receiving updated software via an external interface, and for transmitting the updated software to the safety unit via an internal interface. The external interface can, for example, be connected to the internet via one or more data communication devices, such as a router. The updated software can be received via this external interface. The updating unit can in this case check whether the provider or transmitter of the software is as it claims to be, and/or can decrypt the updated software.

The updating unit and the safety unit can exchange data via an internal interface. The term "external" for an interface can mean that data can be exchanged via said interface with a system that is not a component of the building-based passenger transport system. Conversely, the term "internal" for an interface can mean that data can only be exchanged with components of the building-based passenger transport system. For example, the updating unit can write the updated software directly to a memory of the safety unit. In this way, the software of the safety unit that is required for an update can be reduced to a minimum.

The safety unit and the updating unit are separate units. The safety unit and the updating unit have their own hardware, i.e. each of them can have separate hardware on which the software components of the relevant unit run. The hardware and software for the safety unit can therefore be designed as simply as possible, which can increase personal safety and facilitate the certification. An external interface and complex updating software are not necessary for the safety unit. Conversely, the updating unit can be optimized for data security. More complex software, such as for decrypting/encrypting data, can also be present in the updating unit and can be processed quickly. The updating unit can protect the internal interface to the safety unit. A certification of the updating unit is not necessary, and a greater complexity of the updating unit in this regard is therefore not critical.

The safety unit comprises a first processor, a first volatile memory and a first non-volatile memory. The first non-volatile memory, for example a FLASH memory, can contain the software which is to be updated, which software is replaced by the updated software. The software which is to be updated can also be understood as firmware of the safety unit. The safety unit can be a programmable logic controller (PLC). The safety unit can further comprise ports (communications modules) for data communication via the internal interface and to further components, such as the controller and the safety sensors.

The updating unit comprises a second processor, a second volatile memory and a second non-volatile memory. Updating software, for example, can be stored in the second non-volatile memory of the updating unit, which software comprises an operating system and software components for decryption and encryption, and for communicating via the internal and external interface, etc. Furthermore, the updating unit can comprise ports (communication modules) for data communication via the internal interface and the external interface.

According to one embodiment of the invention, the safety unit and the updating unit are accommodated in a common housing. The safety unit and the updating unit can be a common assembly. It is possible for both units to be accommodated on the same circuit board. It is therefore difficult to tap a line between the safety unit and the updating unit. It is also possible, however, for the two units to be accommodated on separate circuit boards which are arranged in a common housing.

According to one embodiment of the invention, the safety system comprises a plurality of (for example, redundant) safety units. It is also possible for the safety system to consist of a plurality of safety units which are arranged in a distributed manner, and each perform different tasks. The updating unit can be designed to provide all of said safety units with updated software. It is also possible for a safety unit to comprise redundant memory modules which are updated by the updating unit.

According to one embodiment of the invention, updating software for receiving the updated software and transmitting the updated software to the safety unit is stored in the updating unit. The updating software can be stored in encrypted form in the second non-volatile memory. The updating software can also be stored in a protected non-volatile memory, in encrypted form. The updating software can be decrypted by the updating unit before said software is run.

According to one embodiment of the invention, the updating unit comprises a protected non-volatile memory that cannot be changed via the external interface. In this non-volatile memory, for example a protected FLASH memory, data can be stored which are protected from being altered by means of an unauthorized access via the external interface.

According to one embodiment of the invention, a boot-loader of the updating unit is designed to decrypt the updating software and load it into the second volatile memory of the updating unit. The bootloader can be stored in a protected non-volatile memory. The updating unit can carry out a secure boot process, in that the boot loader, which cannot be altered externally, loads, decrypts, and starts updating software in a volatile memory, which software is, for example, from a non-volatile memory which can be altered externally.

According to one embodiment of the invention, a private key for the safety system is stored in the protected non-volatile memory. Data received via the external interface can be decrypted using said key. Encrypted updating software stored in the updating unit can also be decrypted using the private key. The private key can be uniquely assigned to the updating unit.

According to one embodiment of the invention, a public key of a provider of the updated software is stored in the protected non-volatile memory. Using this public key, the provider can be authenticated and/or data can be encrypted for said provider.

According to one embodiment of the invention, the updated software is stored in unencrypted form in the first non-volatile memory of the safety unit. Since the safety unit is protected by the updating unit against external unauthorized access, it is not necessary to implement internal data security measures for the safety unit.

A further aspect of the invention relates to a method for updating software of a safety system, as described above and in the following. For example, the method can be carried out by a processor of the updating unit and optionally by a processor of the safety unit. It is to be understood that features of the method can also be features of the safety system and vice versa.

According to an embodiment of the invention, the method comprises: authenticating a provider of the updated software using the external interface; receiving, by means of the updating unit, a data packet which has the updated software via the external interface; transferring the updated software to the safety unit via the internal interface; and storing the updated software in a non-volatile memory of the safety unit.

The authentication can be carried out using a public key of the provider that is stored in the updating unit.

The data package which has the updated software can comprise a header which can only be decrypted using a private, individual key of the safety unit. Said header can contain information about the content of a further part of the data packet, which, for example, can only be sent by the provider after the header has been received.

For example, the data packet can only comprise changed components of the software which is to be updated, and the header can also indicate which parts of the software, which is to be updated using the updated software, are to be replaced.

The updated software can, for example, be stored directly by the updating unit. It is also possible, however, for the safety unit to have its own updating software as a software component which takes over the storage of the updated software.

According to an embodiment of the invention, the method further comprises: decrypting the data packet using the updating unit. The data packet can also be decrypted using the private key. It is also possible, however, for at least part of the data packet to be encrypted differently using the updated software.

According to one embodiment of the invention, the data packet, or at least part of the data packet which has the updated software, is encrypted using a symmetric encryption method, as defined for example in the AES (Advanced Encryption Standard). The temporary key for the symmetric encryption method can be exchanged with keys of an asymmetric encryption method, such as the abovementioned public and private keys.

According to an embodiment of the invention, the method further comprises: the updating unit regularly requesting updated software from the provider. The updating software can take on the task of checking when updated software is available. For this purpose, for example, an address stored in the updating unit can be retrieved.

According to an embodiment of the invention, the method further comprises: a request for a transmission of the updated software from the updating unit to the safety unit; and preventing a transmission by the safety unit when said unit is in a normal mode. In a normal mode or monitoring mode, in which the safety unit monitors the safety of the building-based passenger transport system, the safety unit can prevent any communication via the internal interface.

According to one embodiment of the invention, the updated software is transmitted only when the safety unit is in an update mode. An update of the software has to be requested by the updating unit, for example. The software can only be updated when the safety unit is in an update mode, for example, when all actuators of the building-based passenger transport system are disabled. During the update, the safety unit can issue a warning signal that prevents actuators of the building-based passenger transport system from being activated.

It should be noted that some of the possible features and advantages of the invention are described herein with reference to different embodiments. A person skilled in the art recognizes that the features can be combined, adapted or replaced as appropriate in order to arrive at further embodiments of the invention.

In the following, embodiments of the invention shall be described with reference to the attached drawings, wherein neither the drawings nor the description are intended to delimit the invention.

DESCRIPTION OF THE DRAWINGS

FIG. 1 schematically shows a building-based passenger transport system in the form of an elevator system having a safety system according to an embodiment of the invention.

FIG. 2 shows a safety system according to an embodiment of the invention.

FIG. 3 shows a safety system according to a further embodiment of the invention.

FIG. 4 shows a flow chart for a method for updating software of a safety system according to an embodiment of the invention.

The drawings are merely schematic and not to scale. In the different figures, identical reference signs denote identical or similar features.

DETAILED DESCRIPTION

FIG. 1 shows a building-based passenger transport system 10 in the form of an elevator system 10. An elevator system will be described below by way of example. However, it should be understood that other passenger transport systems 10, such as escalators or moving walkways, can also include a safety system, as described in the following.

The elevator system 10 comprises an elevator shaft 12, in which an elevator car 14 and a counterweight 16 can be moved. For this purpose, the elevator car 14 and the counterweight 16 are suspended on a cable-like or belt-like suspension means 18, which can be moved by a drive motor 20. The operation of the elevator system 10 and in particular the drive motor 20 can be controlled using a central control unit 22.

In order to be able to ensure correct functioning and, in particular, safety of the elevator system 10, a plurality of safety sensors 26 are accommodated in a structure 24 that houses the elevator system 10. In this case, the safety sensors 26 are arranged distributed over the structure 24. The safety sensors 26 can, for example, comprise a door switch 28 or be connected to a door switch 28, which can monitor a closure state of doors 30 of the elevator system 10, in particular of doors to building floors. Furthermore, a ladder 32 can also be mounted close to a floor or a pit of the elevator shaft 12, for example, the correct, neat positioning of which ladder on a side wall of the elevator shaft 12 is monitored, for example, by means of a switch 33 which is connected to a safety sensor 26.

The safety sensors 26 can, for example, be connected to a safety system 36 via a serial bus 34, which system, based on the signals from the safety sensors 26, generates a warning signal when the signals indicate that there is a safety problem. When the controller 22 receives a warning signal, it can, for example, stop the operation of the elevator system 10 or prevent said system from starting operation.

FIG. 2 shows a safety system 36 comprising an updating unit 38 and one or more safety units 40, 40', 40". The updating unit 38 can exchange data with a data communication unit 44 via an external interface 42, which data are provided, for example, via the internet 46 by a provider 48, for example by an internet server. In particular, the provider can provide updated software 50 for the safety units 40, 40', 40" that is then downloaded by the updating unit 38 and possibly decrypted using the external interface 42. The updated software 50 is then imported into the one or more safety units 40, 40', 40" via an internal interface 52.

The data communication unit 44 can be, for example, a router or a mobile radio unit which is connected to the updating unit 38 via a local area network (LAN). For example, the external interface can be operated by means of Ethernet.

The updating unit 38 can be an embedded device, i.e., a computer which provides corresponding input/output components for the external interface 42 and the internal interface 52.

The one or more safety units 40, 40', 40" can also be embedded devices which provide a corresponding input/output component for the internal interface 52, for the safety sensors 26 and the central controller 22. One possibility is that the one or more safety units 40, 40', 40" comprise a programmable logic controller (PLC).

It is possible for there to be redundant safety units 40, 40' which generate the warning signal for the central controller 22. For example, redundant safety units 40, 40' can monitor one another for malfunctions. Redundant safety units 40, 40' can be implemented in an embedded device and/or in a programmable logic controller (PLC). It is also possible for a further safety unit 40" to generate a further warning signal for a further controller 22' of the system 10. For example, an elevator system having a plurality of drives 20 could have a plurality of controllers 22, 22', all of which should be stopped when a safety sensor 26 signals problems.

The one or more safety units 40, 40', 40" are, for example, connected to the updating unit 38 via a serial bus as an internal interface 52. By separating the safety system into the units 38, 40, 40', 40", each of which comprises its own computer, the external communication and an internal software update can be separated from one another by the internal interface 52. The updating unit 38 can be implemented and optimized such that the data security is as great as possible. The one or more safety units 40, 40', 40" can be implemented and optimized in such a way that the personal security is as great as possible and the setup is as simple as possible.

FIG. 3 shows a safety system 36, in which the updating unit 38 and the safety unit 40 are provided as a common component in a common housing 54. For example, the updating unit 38 and the safety unit 40 can be accommodated on a common circuit board.

The safety unit 40, for example a programmable logic controller (PLC), comprises a first processor 56, a first volatile memory 58, for example RAM, and a first non-volatile memory 60, for example a FLASH memory. The software or firmware 62 which is to be updated, and which evaluates the signals from the safety sensors 26 and generates the warning signal, is located in the non-volatile memory. The software 62 can also contain software components that are responsible for updating the software 62.

The safety unit 40 further comprises an input/output component 64 for communication with the updating unit 38. The bus or data communication line between the safety unit 40 and the updating unit 38 can be completely contained in the housing 54. As a result, no external manipulation can take place here either.

The safety unit 40 further comprises an input/output component 66 for communicating with the controller 22 and/or the safety sensors 26. The input/output component 66 can be designed such that updating the software 62 via said component is not possible. For example, the input/output component 66 could be purely analog.

The updating unit 38, for example an embedded device, comprises a second processor 68, a second volatile memory 70, for example RAM, and a second non-volatile memory 72, for example a FLASH memory. Software or firmware (updating software) 74 is located in the non-volatile memory, which software or firmware is responsible for communicating with the provider 48 and receiving, decrypting and sending the software 50 to be updated.

The updating unit 38 can comprise a protected non-volatile memory 76 that is protected from updates via the external interface 42. For example, the protected non-volatile memory 76 can be a FLASH memory or an EPROM that can only be changed by a mechanical intervention in the safety system 36 (such as opening the housing 54).

The protected non-volatile memory 76 can include a bootloader 78 which decrypts the updating software 74 which can only be stored in the memory 72 in encrypted form, and loads said software into the volatile memory 70. The updating software 74 can also be located, at least in part, in the protected non-volatile memory 76.

A private key 80 for the updating unit 38 can also be located in the protected non-volatile memory 76, using which key, for example, the updating software 74 can be decrypted.

In addition, a public key 82 of the provider 48 of updated software 50 can be located in the protected non-volatile memory 76, using which key, for example, the provider 48 can be authenticated when a data communication is established therewith.

Furthermore, the updating unit 38 comprises an input/output component 84 for communicating with the safety unit 40, and an input/output component 86 for communicating with the data communication unit 44, for example by means of ethernet.

It should be understood that the safety units 40, 40', 40" shown in FIG. 2 can be constructed like the safety unit 40 shown in FIG. 3. The same applies to the updating unit 38 and to the safety system 36.

FIG. 4 shows a flow chart for a method for updating software of a safety system 36, as shown, for example, in the preceding figures.

In step S10, the updating unit 38 regularly queries the provider 48 via the external interface 42 as to whether updated software 50 is available. This can occur once a day, for example. In this case, the provider 48 of the updated software 50 can also be authenticated, i.e. it can be checked whether the provider 48 is really the provider from which updated software 50 is to be requested. The authentication can be carried out using the public key 82, for example.

For example, the provider 48 can be a server which is provided by a manufacturer and/or those responsible for the maintenance of the system 10 for software updates.

If updated software 50 is available, a data packet 88 which has the updated software 50 is received in step S12 by the updating unit 38 via the external interface 42. For example, a header 90 of the data packet 88 can be received first, in which header information about the scope of the updated software 50 is stored. It is possible that not all software 62 to be updated should be updated, but instead only parts thereof. This can be stored in the header 90.

It is also possible that the data packet 88, or the body and/or the updated software 50 thereof, are encrypted using a symmetric encryption method. The associated temporary key can be determined for this purpose by means of the two keys 80, 82.

If the data packet 88 or the updated software 50 is encrypted, the updating unit 38 carries out the decryption in step S14. The updated software 50 is now in decrypted form in the volatile memory 70 of the updating unit 38.

For the internal interface 52, there can be an update protocol between the updating unit 38 and the safety unit 40, which, inter alia, ensures that the updated software 50 is only transmitted when the safety unit 40 is in an update mode.

For this purpose, in step S16, the updating unit 38 can query the safety unit 40 via the internal interface 52 as to whether the safety unit 40 is ready for a transmission of the updated software 50. If this is not the case, because the safety unit is in a normal mode, for example, this can prevent a transmission.

Following this request, the safety unit 40 can also actively switch to the update mode or wait for an opportunity to switch to the update mode, for example, when the system 10 is deactivated. If the safety unit 40 is in the update mode, it can inform the updating unit 38 accordingly via the internal interface 52.

In step S18, when the safety unit 40 is in the update mode, the updated software 50 is transmitted to the safety unit 40 via the internal interface 52. The updated software 50 can be stored in the non-volatile memory 60 of the safety unit 40 in unencrypted form.

Finally, it should be noted that terms such as "comprising," "including," etc. do not preclude other elements or steps, and terms such as "a" or "an" do not preclude a plurality. It must further be noted that features or steps which have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A safety system for a building-based passenger transport system, the safety system comprising:
   a safety unit receiving safety-relevant signals from components of the passenger transport system, and for triggering a safety measure in response to the signals;
   an updating unit receiving updated software from a provider external to the passenger transport system via an external interface, and transmitting the updated software to the safety unit via an internal interface;
   wherein the safety unit includes a first processor, a first volatile memory and a first non-volatile memory cooperating to store and run software and/or firmware that evaluates the signals;
   wherein the updating unit includes a second processor, a second volatile memory and a second non-volatile memory cooperating to receive the updated software and transmit the updated software to the safety unit; and wherein the updating unit does not run the software and/or firmware stored in the safety unit and does not run the updated software.

2. The safety system according to claim 1 wherein the safety unit and the updating unit are accommodated in a common housing.

3. The safety system according to claim 1 wherein the safety system includes a plurality of the safety unit, and wherein the updating unit transmits the updated software to each of the safety units.

4. The safety system according to claim 1 wherein updating software for receiving the updated software and for transmitting the updated software to the safety unit is stored in the updating unit, and wherein the updating software is stored in encrypted form in the second non-volatile memory.

5. The safety system according to claim 1 wherein the updating unit includes a protected non-volatile memory that cannot be changed via the external interface.

6. The safety system according to claim 5 wherein the updating unit includes a bootloader for decrypting the updating software and loading the decrypted software into the second volatile memory of the updating unit.

7. The safety system according to claim 5 including at least one of a private key for the safety system stored in the protected non-volatile memory and a public key of the provider of the updated software stored in the protected non-volatile memory.

8. The safety system according to claim 1 wherein the updated software is stored in unencrypted form in the first non-volatile memory of the safety unit.

9. A method for updating software of a safety system for a building-based passenger transport system, the safety system including:
a safety unit receiving safety-relevant signals from components of the passenger transport system, and for triggering a safety measure in response to the signals;
an updating unit receiving updated software from a provider external to the passenger transport system via an external interface, and transmitting the updated software to the safety unit via an internal interface;
wherein the safety unit includes a first processor, a first volatile memory and a first non-volatile memory cooperating to store and run software and/or firmware that evaluates the signals; and
wherein the updating unit includes a second processor, a second volatile memory and a second non-volatile memory cooperating to receive the updated software and transmit the updated software to the safety unit;
the method comprising the steps of:
authenticating the provider of the updated software via the external interface;
receiving a data packet that has the updated software from the provider via the external interface with the updating unit;
transferring the updated software to the safety unit via the internal interface; and
storing the updated software in the first non-volatile memory of the safety unit.

10. The method according to claim 9 further comprising decrypting the data packet using the updating unit.

11. The method according to claim 10 wherein the data packet is at least partially encrypted using a symmetric encryption method.

12. The method according to claim 9 further comprising the updating unit regularly requesting the updated software from the provider.

13. The method according to claim 9 further comprising:
generating a request for a transmission of the updated software from the updating unit to the safety unit; and
preventing the transmission when the safety unit is in a normal mode of monitoring a safety of the passenger transport system.

14. The method according to claim 9 wherein the updated software is transmitted to the safety unit only when the safety unit is in an update mode.

15. A safety system for a building-based passenger transport system, the safety system comprising:
a safety unit receiving safety-relevant signals from components of the passenger transport system, and for triggering a safety measure in response to the signals;
an updating unit receiving updated software via an external interface, and transmitting the updated software to the safety unit via an internal interface;
wherein the updated software is received from a provider remote from the passenger transport system;
wherein the safety unit includes a first processor, a first volatile memory and a first non-volatile memory cooperating to store and run software and/or firmware that evaluates the signals;
wherein the updating unit includes a second processor, a second volatile memory and a second non-volatile memory cooperating to receive the updated software and transmit the updated software to the safety unit;
wherein the updating unit does not run the software and/or firmware stored in the safety unit and does not run the updated software; and
wherein the safety unit and the updating unit are accommodated in a common housing.

* * * * *